United States Patent
Chiou et al.

(10) Patent No.: US 9,042,936 B2
(45) Date of Patent: May 26, 2015

(54) COMMUNICATION DEVICE AND POWER CONTROL METHOD THEREOF

(71) Applicant: WISTRON CORP., New Taipei (TW)

(72) Inventors: Sheng-Lun Chiou, New Taipei (TW); Wen-Chieh Wu, New Taipei (TW)

(73) Assignee: Wistron Corp., New Taipei (TW)

( * ) Notice: Subject to any disclaimer, the term of this patent is extended or adjusted under 35 U.S.C. 154(b) by 77 days.

(21) Appl. No.: 13/938,168

(22) Filed: Jul. 9, 2013

(65) Prior Publication Data

US 2014/0135054 A1 May 15, 2014

(30) Foreign Application Priority Data

Nov. 15, 2012 (TW) .............................. 101142565 A (51) Int. Cl.
*H04W 52/14* (2009.01)
*H04W 52/36* (2009.01)
*H04W 52/28* (2009.01)

(52) U.S. Cl.
CPC .......... *H04W 52/146* (2013.01); *H04W 52/281* (2013.01); *H04W 52/367* (2013.01)

(58) Field of Classification Search
CPC . H04W 52/146; H04W 52/242; H04W 52/40; H04W 52/42
USPC .................. 455/522, 67.11, 127.2, 138, 219; 375/267; 370/280, 294
See application file for complete search history.

(56) References Cited

U.S. PATENT DOCUMENTS

| | | | | |
|---|---|---|---|---|
| 5,659,892 | A * | 8/1997 | Soleimani et al. | 455/103 |
| 8,144,634 | B2 * | 3/2012 | Nejatian | 370/280 |
| 8,290,085 | B2 | 10/2012 | Chan et al. | |
| 2006/0158251 | A1 * | 7/2006 | Ichitsubo et al. | 330/126 |
| 2007/0115054 | A1 * | 5/2007 | Ichitsubo et al. | 330/126 |
| 2007/0135071 | A1 * | 6/2007 | Lee et al. | 455/232.1 |
| 2009/0154597 | A1 | 6/2009 | Pan | |
| 2010/0246705 | A1 * | 9/2010 | Shin et al. | 375/267 |
| 2010/0308909 | A1 | 12/2010 | Verma et al. | |
| 2011/0105173 | A1 | 5/2011 | Haim et al. | |
| 2012/0187989 | A1 * | 7/2012 | Barnes | 327/157 |
| 2014/0135054 | A1 * | 5/2014 | Chiou et al. | 455/522 |

OTHER PUBLICATIONS

Taiwan Patent Office, Office Action, Patent Application No. 101142565, Dec. 19, 2014, Taiwan.

\* cited by examiner

*Primary Examiner* — Minh D Dao (57) ABSTRACT

A communication device and a power control method thereof are provided. The power control method, performed by a communication device, includes: determining a power range of a transmit power of an uplink signal; determining a gain switch range based on the power range; when the transmit power of the uplink signal is within the gain switch range, determining a first gain mode for amplifying the uplink signal; and when the transmit power of the uplink signal is out of the gain switch range, determining a second gain mode for amplifying the uplink signal.

18 Claims, 6 Drawing Sheets

COMMUNICATION DEVICE AND POWER CONTROL METHOD THEREOF

CROSS REFERENCE TO RELATED APPLICATIONS

This Application claims priority of Taiwan Patent Application No. 101142565, filed on Nov. 15, 2012, and the entirety of which is incorporated by reference herein.

BACKGROUND

1. Field

The present disclosure relates to a power control mechanism, and in particular, a communication device and a power control method thereof.

2. Description of the Related Art

In recent years, users have changed their way of using mobile communication devices such as a smart phone or a tablet, by blogging and sharing their daily life experiences, increasing communication for work and business, and using the mobile communication devices for education and entertainment. Accordingly, network operators have increased the bandwidth for mobile networks in order to meet an expanding range of user applications.

A power amplifier (PA) plays an important role in a radio frequency (RF) transmitter circuit of a mobile communication device, serving to amplify a signal before driving the signal on the communication channel. The PA is typically placed next to the antenna, and consumes the most power in the transmitter circuit. As the requirement for radio bandwidth increases, the power consumption at the transmitter circuit becomes a crucial issue for designers. In order to increase a Power Added Efficiency (PAE) of the PA, the circuit design of the PA deploys several gain modes. The adjacent gain modes overlap with each other. With the employment of PA switch points (PASP) for the gain modes, the power amplifier can provide continuous and stable linear transmit power. Since the PA employs several gain modes, circuit designers are required to consider the overlapping coverage of the gain modes for the transmitter circuit to determine a set of PASPs. The determining of the set of PASPs, negatively impacts circuit performance and battery life of a mobile communication device.

BRIEF SUMMARY OF THE DISCLOSURE

A detailed description is given in the following embodiments with reference to the accompanying drawings.

An embodiment of a power control method is disclosed, performed by a communication device, comprising: determining a power range of a transmit power of an uplink signal; determining a gain switch range based on the power range; when the transmit power of the uplink signal is within the gain switch range, determining a first gain mode for amplifying the uplink signal; and when the transmit power of the uplink signal is out of the gain switch range, determining a second gain mode for amplifying the uplink signal.

Another embodiment of a communication device is provided, comprising a controller and a power amplifier. The controller is configured to determine a power range of a transmit power of an uplink signal, and determine a gain switch range based on the power range, and when the transmit power of the uplink signal is within the gain switch range, determine a first gain mode and when the transmit power of the uplink signal is out of the gain switch range, determine a second gain mode. The power amplifier, coupled to the controller, is configured to amplify the uplink signal with the first or the second gain mode.

BRIEF DESCRIPTION OF THE DRAWINGS

The present disclosure can be more fully understood by reading the subsequent detailed description and examples with references made to the accompanying drawings, wherein.

DETAILED DESCRIPTION OF THE DISCLOSURE

The following description is of the best-contemplated mode of carrying out the disclosure. This description is made for the purpose of illustrating the general principles of the disclosure and should not be taken in a limiting sense. The scope of the disclosure is best determined by reference to the appended claims.

Figure 1:
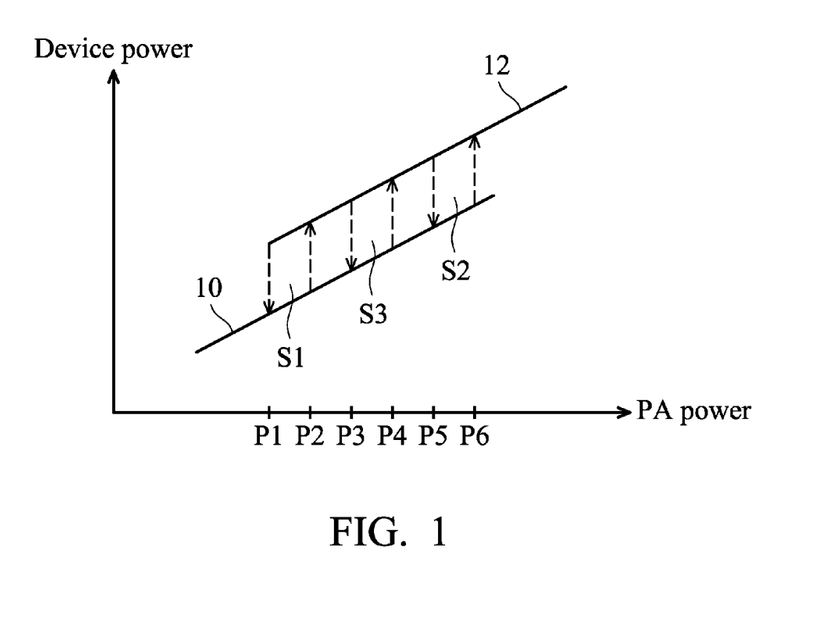
FIG. 1 illustrates a switch mechanism switching a gain mode for a Power Amplifier PA of a communication device according to an embodiment of the disclosure.

FIG. 1 illustrates a switch mechanism switching a gain mode for a Power Amplifier PA of a communication device according to an embodiment of the disclosure, where the horizontal axis represents a power of the PA, and the vertical axis represents a power of the communication device. The embodiment shows two gain modes for the power amplifier PA, including a low gain mode 10 and a high gain mode 12. The power amplifier PA is configured to switch between the low gain mode 10 and the high gain mode 12 based on one of three possible gain switch ranges S1, S2, and S3, and amplify the power for an uplink signal according to the switched low gain mode 10 or the high gain mode 12, thereby driving the amplified uplink signal on an appropriate communication channel. The communication device can select one from the three possible gain switch ranges S1, S2 and S3 based on a characteristic of the required transmit power of the uplink signal, thereby controlling the gain mode adopted by the power amplifier PA. The communication device may be a smart phone, a tablet, a laptop or another electronic device with a wireless communication capability.

After the design architecture of a radio frequency (RF) transmitter circuit is decided, the possible gain switch ranges for the RF transmitter circuit can also be determined, accordingly. The gain switch ranges for the power amplifier PA is an adaptable range between the switching points of the gain modes, or within the range of power P1 through P6 in FIG. 1. Further, the gain switch ranges for the power amplifier PA may include the three possible gain switch ranges S1, S2 and S3.

In the gain switch range S1, when the power amplifier PA is in the low gain mode 10 and the required PA power exceeds the power P2, the power amplifier PA is configured to switch to the high power mode 12 to amplify the power of the uplink signal. Conversely, when the power amplifier PA is in the high gain mode 12 and the required PA power is lower than the power P1, the power amplifier PA is configured to switch to the high power mode 10 to reduce the power amplification of the uplink signal. In comparison to the other gain switch ranges S2 and S3, since the switching point of the gain modes falls onto the high gain mode 12 in advance, the power amplifier PA allows for increased linear amplification headroom while increasing the power consumption. The gain switch range S1 is preferred for the wireless communication systems which require increased modulation such as 16 QAM or 64 QAM, and increased transmit speed or bandwidth such as the Wideband Code Division Multiple Access (W-CDMA) technology, the Carrier Aggregation (CA) of the Long Term Evolution-Advanced (LTE-A), and the multiplex of the sub-carriers such as an OFDM or multi-layer modulator. The gain switch range S1 can be implemented for the telecommunication technologies such as the versions Rel-5, Rel-6 and Rel-7 (W-CDMA), the versions Rel-8 and Rel-9 (Long Term Evolution, LTE), and the versions Rel-10, Rel-11, and later versions (LTE-A). Similar communication systems include high-speed transmission transmitters for the IEEE 802.11n/ac/ad systems.

In the gain switch range S2, when the power amplifier PA is in the low gain mode 10 and the required PA power exceeds the power P6, the power amplifier PA is configured to switch to the high power mode 12 to amplify the power of the uplink signal. Conversely, when the power amplifier PA is in the high gain mode 12 and the required PA power is lower than the power P5, the power amplifier PA is configured to switch to the high power mode 10 to reduce the power amplification of the uplink signal. In contrast to the gain switch range S1, the gain switch range S2 has an increased probability to stay in the low gain mode 10. As a consequence, the power amplifier PA requires less power consumption. In particular, the gain switch range S2 may cause signal distortion for certain RF signal transmission modes. For example, certain combinations of modulations in the physical layer or first layer and radio resource scheduling can result in an increased peak-to-average ratio (PAPR). The gain switch range S2 is preferred for wireless communication systems with reduced transmission speeds and modulation technologies, e.g., BPSK or QPSK modulation technologies and multiplex technologies for small numbers of channels in the physical layers.

The gain switch range S3 prevents the power amplifier PA from consuming excessive power as in the gain switch range S1, and insufficient power headroom as in the gain switch range S2, providing an alternative for a flexible and compromised solution for the power amplifier PA.

The embodiments can prolong the battery life of the communication device, providing a solution for dynamically adapting the gain switch range for the power amplifier PA, thus, increasing the battery life of the communication device.

Figure 2:
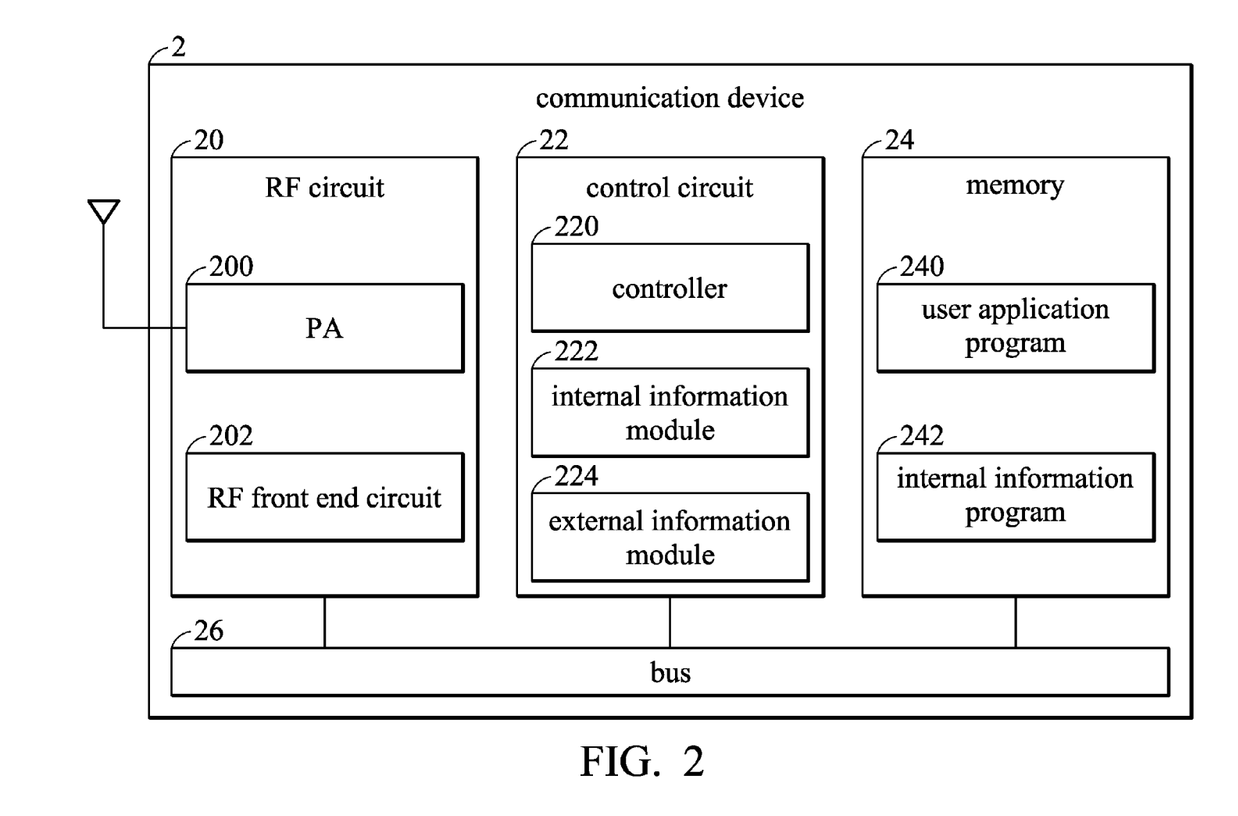
FIG. 2 is a block diagram of a communication device 2 according to an embodiment of the disclosure.

FIG. 2 is a block diagram of a communication device 2 according to an embodiment of the disclosure, including a radio frequency (RF) circuit 20, a control circuit 22, a memory 24 and a bus 26 (one or more transmission interfaces). The RF circuit 20, the control circuit 22 and the memory 24 communicate and exchange data via the bus 26. The communication device 2 can be implemented to realize the multi-switch range mechanism depicted in FIG. 1. In particularly, the communication device 2 is configured to estimate a required power range for the power amplifier PA, and select one of a plurality of switch ranges based on the estimated power range for use in the power amplifier PA.

The RF circuit 20 is configured to transmit an uplink signal to and receive a downlink signal from the air interface. The control circuit 22 is configured to perform various baseband signal processing and communication protocol processing procedures in the communication modem or communication CPU module. The baseband signal processing performed by the control circuit 22 includes determining the radio resource assigned to the communication device 2 by the network system and the signal quality of the environment. The memory 24 is configured to store program codes and data such as the operation system programs and user application programs, and collecting information on the times, locations or software used by the wireless module on the communication device 2, so that the control circuit 22 can analyze the PA gain switch ranges or the transmit power associated messages to adaptively adjust parameters for the power amplifier PA. The control circuit 22 and memory 24 are configured to provide external information functionalities and internal information functionalities for adjusting the PA gain switch ranges adaptively, so that the PA gain switch range of a power amplifier PA 200 can be optimized for the battery life based on user behavior or conditions of the wireless environment.

The RF circuit 20 includes the power amplifier PA 200 and an RF front-end circuit 202. The RF circuit 20 may further include a match circuit, various filters and wiring layouts (not shown). After the hardware architecture is determined, the communication device 2 can determine a set of PA gain switch ranges for the FR circuit 20 via the RF calibration procedure during the device startup or the factory test, thereby acquiring stable efficiency for the RF circuit 20. The power amplifier PA 200 includes two or more gain modes such as high, intermediate and low gain modes. Each gain mode has two or more gain switch ranges controlled and selected by the control circuit 22. For example, the low gain mode has two gain switch ranges, one providing an increased transmit power headroom for the power amplifier, and the other preventing a power amplifier from consuming excessive power. In some embodiments, the power amplifier PA 200 can receive a gain control signal from the control circuit 22 to select one of a plurality of gain modes for amplifying the power of the uplink signal and driving the amplified uplink signal to a receiver, base station, or a network system.

The control circuit 22 includes a controller 220, a communication protocol module 222 and external information module 224, configured to process all data and information associated with the environment external to the communication device 2. The control circuit 22 is configured to compute the transmit power of the uplink signal according to the processed data and information, and determine the PA gain switch range based on the computed transmit power for the uplink signal. The information or data associated with external environment include the network resource assignment and the wireless channel environment. The network system can assign limited radio resources including Radio Resource Management (RRM), Transmit Power Control (TPC), and Quality of Service (QoS) to the wireless communication devices in the coverage. The control circuit 22 can compute a transmit power for the uplink signal based on the assigned radio resources. For example, the network system can assign a plurality of carriers, certain transmit powers, and a real-time QoS to the communication device 2. The communication protocol module 222 is configured to interpret the system information sent from the network system to acquire the information on the assigned carriers, the transmit power and the QoS. Then the controller 220 is configured to compute the transmit power of the uplink signal and the distribution of the transmit powers of the uplink signals based on the acquired information on the assigned carriers, the transmit power and the QoS. In some embodiments, the communication protocol module 222 can communicate with the network system with a shared communication protocol, thereby, adjusting the PA gain switch mode to increase the battery life. Moreover, since the network system adopts various types of base stations, including macrocells, microcells, picocells, femtocells or other types of cells and various types of service versions, the signal interferences in the radio channel can vary with user environment. Accordingly, the external information module 224 in the control circuit 22 is configured to compute the PA gain switch range and the radio channel estimation to compute a Signal to Interference and Noise Ratio (SINR), so that the controller 220 can determine the transmit power of the uplink signal and the distribution of the transmit powers of the uplink signals based on the computed SINR. Finally, the controller 220 is configured to determine the gain switch range of the power amplifier PA 200 according to the determined distribution of the transmit powers of the uplink signals, and determine one PA gain mode according to the determined gain switch range and the transmit power of the uplink signal, and pass the determined PA gain mode to the power amplifier PA 200 by a gain control signal, thereby amplifying the power for the uplink signal. For example, when the transmit power of the uplink signal exceeds an upper switch point of the gain switch range, the controller 220 is configured to switch the power amplifier PA 200 to an increased level of the gain modes. Whereas, when the transmit power of the uplink signal is less than a lower switch point of the gain switch range, the controller 220 is configured to switch the power amplifier PA 200 to a decreased level of the gain modes. When the transmit power of the uplink signal is within the upper switch point and the lower switch point of the gain switch range, the controller 220 is configured to remain in a current gain mode. The communication protocol module 222 and the external information module 224 may be a digital circuit (e.g., digital signal processor, DSP) or a memory with an associated driving program. The distribution of the transmit power of the uplink signal and the corresponding gain switch range can be recorded in a lookup table in a memory device in the control circuit 22 or in other locations.

The memory 24 includes a user application program 240 and internal information program 242, configured to process data associated with the internal data of the communication device 2. A processor or controller (not shown) can access the program codes in the user application program 240 or the internal information program 242 and execute the program codes, accordingly. In some embodiments, the controller 220 in the control circuit 22 can access the user application program 240 or the internal information program 242, collect the information on the times, locations and associated software used on the communication device 2, analyze the PA gain switch ranges or transmit power associated messages and accordingly adapt the parameters for the power amplifier PA 200. For example, the user can specify an upload speed, a bandwidth limit or a data stream limit for a certain time, location, network service or software, then the controller 220 can estimate the transmit power of the uplink signal and the distribution of the transmit powers of the uplink signals according to the specified upload speed, the bandwidth limit or the data stream limit, thereby determining a gain switch range for the power amplifier PA 200 based on the estimated the transmit power of the uplink signal and the distribution of the transmit powers of the uplink signals. The controller 220 can access the internal information program 242 from the memory 24 to analyze the information on the times, locations, associated services and software, to derive a statistical measure, thereby acquiring the corresponding gain switch range. When the communication device 2 requests for a network service later, the internal information program 242 can determine a corresponding gain switch range for use in the controller 220 based on the analyzed information. The controller 220 is configured to determine a PA gain mode based on the corresponding gain switch range and the transmit power of the uplink signal, and send the gain determined by the PA gain mode via the gain control signal to the power amplifier PA 200, amplifying the power of the uplink signal. The distribution of the transmit power of the uplink signal and the corresponding gain switch range can be recorded in a lookup table in the memory 24 or in memory at other locations.

Figure 3A:
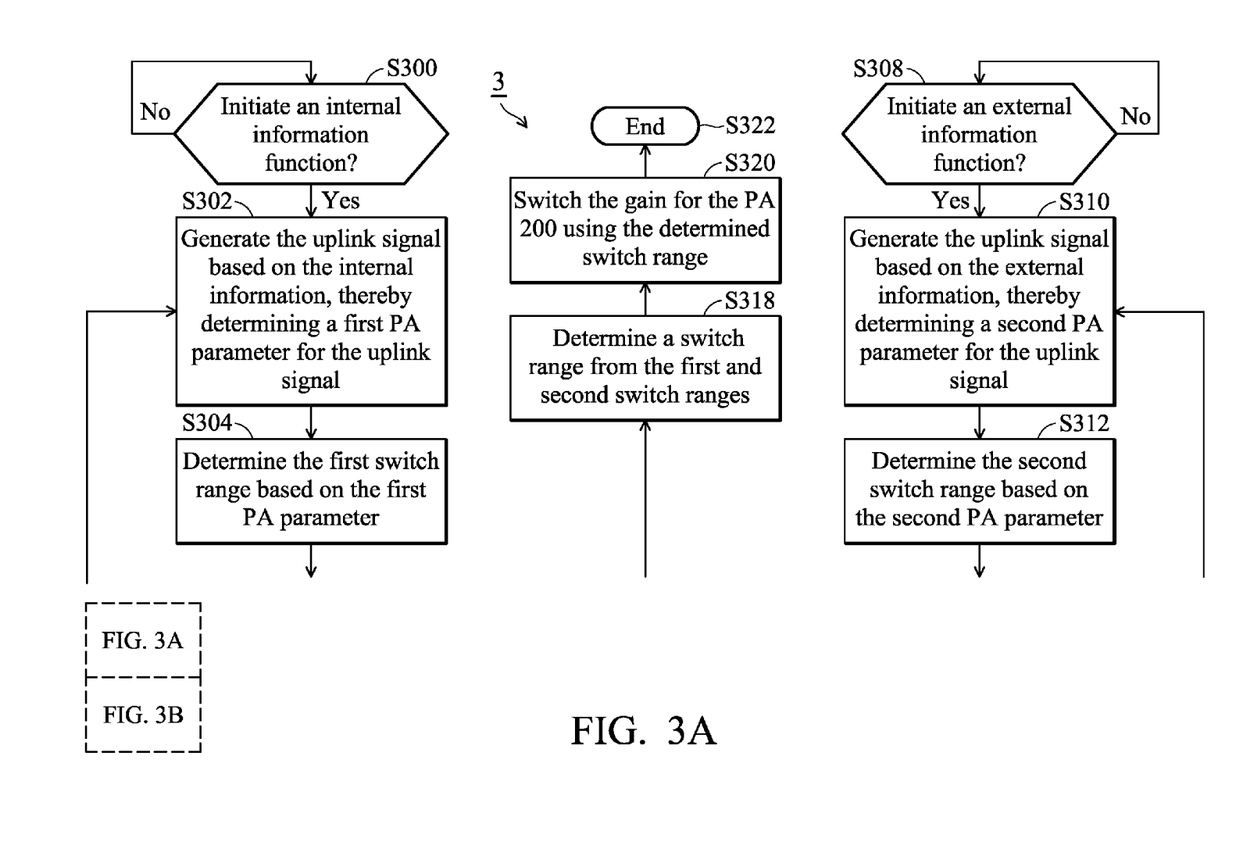
FIGS. 3A and 3B are a flowchart of a switch method 3 switching gain modes for a power amplifier.
Figure 3B:
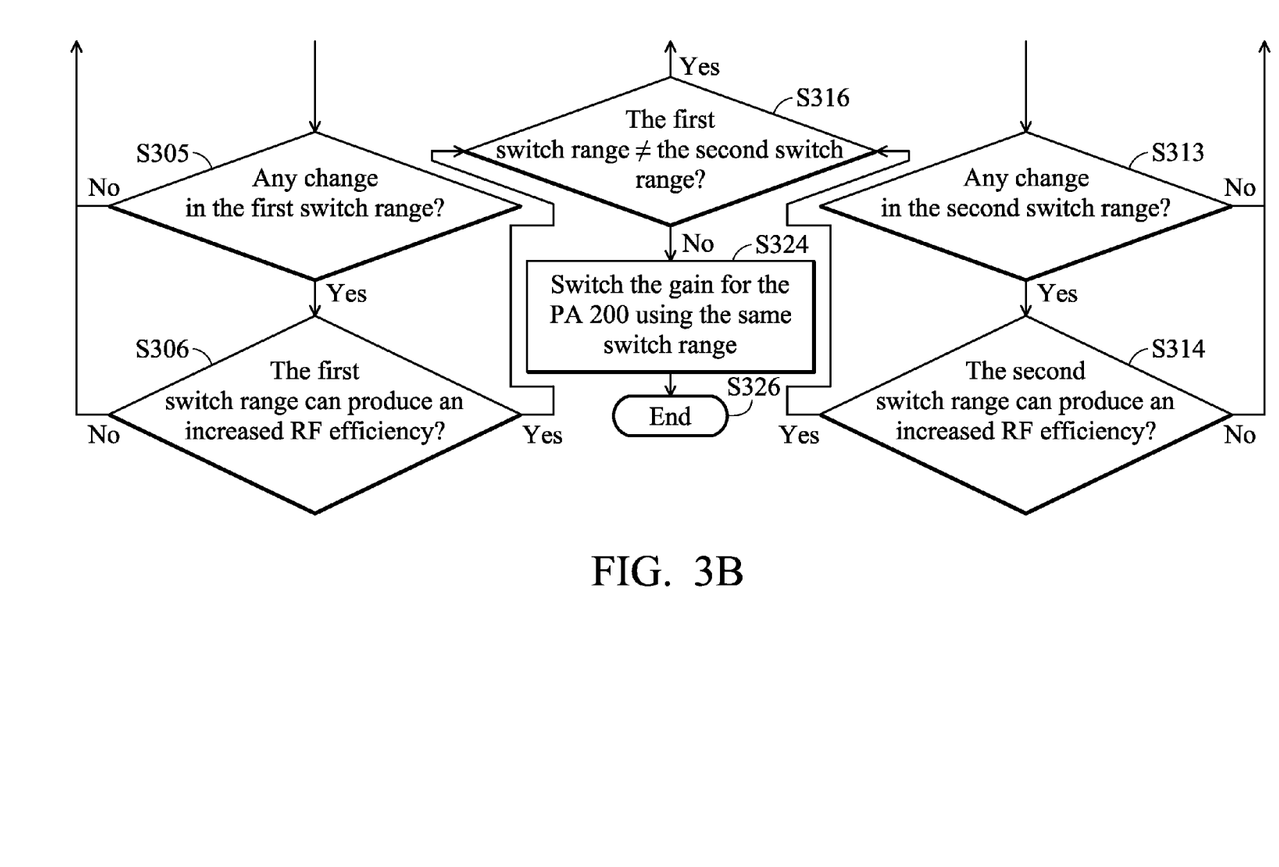

FIGS. 3A and 3B are a flowchart of a switch method 3 switching gain modes for a power amplifier, incorporating the communication device 2 in FIG. 2.

After the communication device 2 is initialized, it can determine a gain switch range according to the internal information functionalities associated with user behavior or demands and the external information functionalities. Regarding the internal information functionalities, the controller 220 is configured to check whether an option for the internal information functionalities has been activated (S300). If the option has not been activated, the controller 220 is configured to regularly or continuously determine the status of the option for the internal information functionalities (S300).

Figure 4:
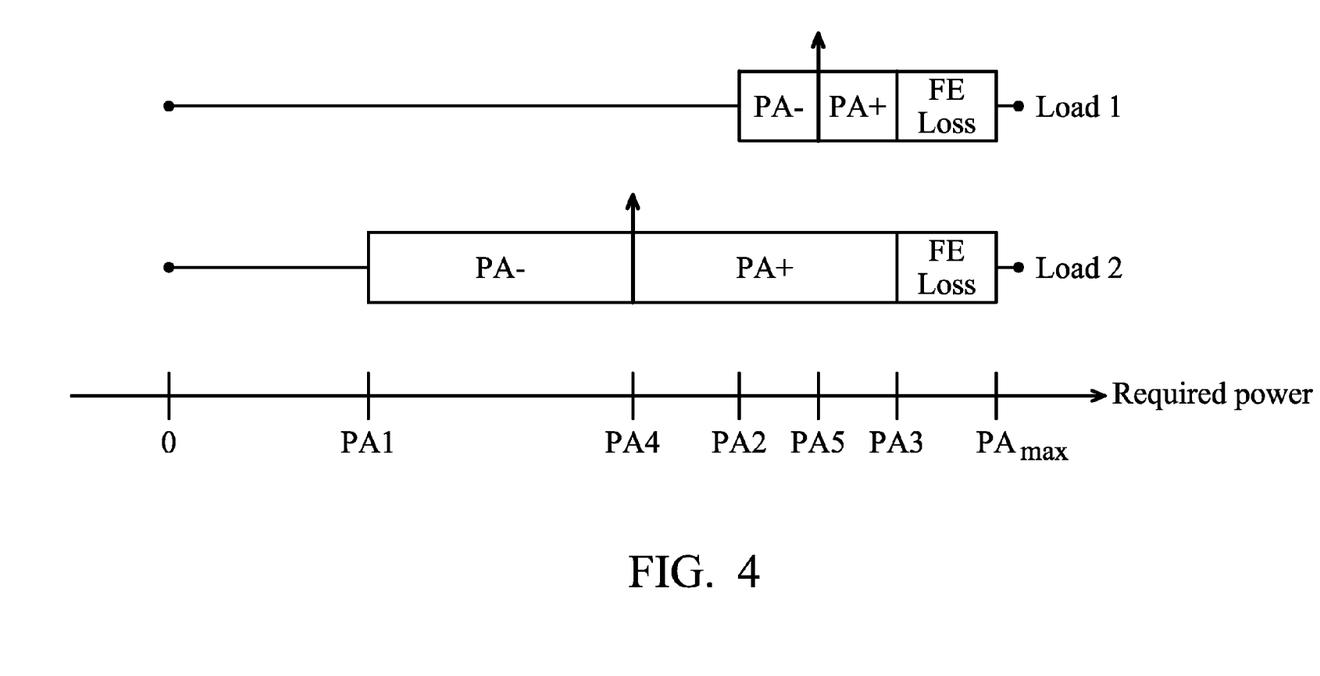
FIG. 4 illustrates a distribution of the PA parameters of the power amplifier according to an embodiment of the disclosure.

If the option has been activated, the controller 220 is configured to produce the uplink signal based on the internal information, and determine a PA parameter representing the distribution of the transmit powers of the uplink signals (S302). The controller 220 can execute the user application program 240 and the internal information program 242 to generate the internal information. For example, the user application program 240 may be used to retrieve the internal information input by the user, such as the upload speed, the bandwidth limit or the data stream limit, and the controller 220 is configured to concurrently generate one or more digital output data according tot the input internal information, and sum all of the digital output data together to compute the first PA parameter. The first PA parameter may be a sum of all powers of the digital output data, or the value of the sum of the powers converted in dBm or in a quantization unit. After a period of data collection expired, the controller 220 can establish a distribution of the first PA parameters representing the distribution of the transmit powers of the uplink signals. FIG. 4 illustrates a distribution of the PA parameters of the power amplifier according to an embodiment of the disclosure, including two uplink signals designated by load 1 and load 2 in dBm. As illustrated, the distribution of the PA parameter directly corresponds to the distribution of the required transmit powers of the uplink signals. Each uplink signal includes a parameter range PA−, an average, a parameter range PA+ and a front-end loss potion (FE loss). The parameter range PA− covers a range from the lower limit of the PA parameters to the average of the PA parameters, and the parameter range PA+ covers a range from the average of the PA parameters to the upper limit of the PA parameters. The FE loss is the power consumption in the RF circuit 20 including the RF front-end circuit 202.

After producing a distribution of the PA parameters as illustrated in FIG. 4, the controller 220 is configured to determine a first gain switch range based on the distribution of the PA parameters (S304). For example, when the first PA parameters are the distribution of the load 1 in FIG. 4, since the distribution of the PA parameters is across a small range of the powers PA2-PA3, the controller 220 can select the gain switch range S2 in FIG. 1 as the first gain switch range, so that the power amplifier PA 200 has an increased time operating in the low gain mode, in comparison to other gain switch ranges. When the first PA parameters are the distribution of the load 2, as illustrated in FIG. 4, since the distribution of the PA parameters is across a large range of the powers PA1-PA3, the controller 220 can select the gain switch range S1 in FIG. 1 as the first gain switch range, so that the power amplifier PA 200 has an increased time operating in the high gain mode, in comparison to other gain switch ranges. In other embodiments, the controller 220 is configured to determine the first gain switch range according to the distribution of the PA+ parameters. With reduced distribution of the PA+ parameters, the controller 220 is configured to determine the first gain switch range that has an increased time operating the power amplifier PA 200 under a lower gain mode. Conversely, with increased distribution of the PA+ parameters, the controller 220 is configured to determine the first gain switch range that has an increased time operating the power amplifier PA 200 under a higher gain mode.

Referring again to FIG. 3, the controller 220 can next determine whether the determined first gain switch range is different from the previous first gain switch range (S305). If the two first gain switch ranges are identical, the switch method 3 is configured to return to performing Step S302 for re-computing the PA parameters for the uplink signals. If the two first gain switch ranges are different, the switch method 3 is configured to evaluate whether the newly determined first gain switch range would degrade the RF efficiency of the power amplifier PA 200 (S306). The controller 220 is configured to compute an Adjacent Channel Leakage Power Rate (ACLR), Error Vector Magnitude (EVM), transmit powers, SNR or QoS parameters for the amplified uplink signals, thereby evaluating the present RF efficiency of the power amplifier PA 200. When the determined first gain switch range causes unstable network connection or unsatisfactory QoS for RF efficiency, the controller 220 is configured to retain the previous first gain switch range and the switch method 3 is configured to go back to Step S302 for re-computing the PA parameters. When the determined first gain switch range renders satisfactory RF efficiency, the switch method 3 is configured to perform Step S316. Step S306 is an optional step. In some embodiments, the switch method 3 can perform Step 316 without performing Step S306.

Regarding the external information functionalities, the controller 220 is configured to check whether an option for the external information functionalities has been activated (S300). If the option has not been activated, the controller 220 is configured to regularly or continuously determine the status of the option for the external information functionalities (S308).

If the option has been activated, the controller 220 is configured to produce the uplink signal based on the external information, and determine a PA parameter representing the distribution of the transmit powers of the uplink signals (S310). The external information may be generated by the controller 220, the communication protocol module 222 or the external information module 224. For example, the communication protocol module 222 may be used to retrieve the system information sent from the network system to acquire information on the number of carriers, the assigned transmit power and the quality of service. The external information module 224 is configured to compute the SINR parameter in the radio channel according to the received downlink signal. Next, the controller 220 can estimate one or more digital output data based on the external information such as the number of carriers, the assigned transmit power, the quality of service, the SINR or other external information, and sum all of the digital output data together to compute the second PA parameter. The second PA parameter may be a sum of all powers of the digital output data, or the value of the sum of the powers converted in dBm or in a quantization unit. After a period of data collection, the controller 220 can acquire a distribution of the second PA parameters representing the distribution of the transmit powers of the uplink signals. FIG. 4 illustrates a distribution of the PA parameters of the power amplifier according to an embodiment of the disclosure, including two uplink signals designated by load 1 and load 2 in dBm. As illustrated, the distribution of the PA parameter directly corresponds to the distribution of the required transmit powers of the uplink signals. Each uplink signal includes a parameter range PA−, an average, a parameter range PA+ and a front-end loss potion (FE loss). The parameter range PA− covers a range from the lower limit of the PA parameters to the average of the PA parameters, and the parameter range PA+ covers a range from the average of the PA parameters to the upper limit of the PA parameters. The FE loss is the power consumption in the RF circuit 20 including the RF front-end circuit 202.

After producing a distribution of the PA parameters as illustrated in FIG. 4, the controller 220 is configured to determine a second gain switch range based on the distribution of the PA parameters (S312). For example, when the first PA parameters are the distribution of the load 1 as illustrated in FIG. 4, since the distribution of the PA parameters is across a small range of the powers PA2-PA3, the controller 220 can select the gain switch range S2 in FIG. 1 as the second gain switch range, so that the power amplifier PA 200 has an increased time operating in the low gain mode, in comparison to other gain switch ranges. When the second PA parameters are the distribution of the load 2 as illustrated in FIG. 4, since the distribution of the PA parameters is across a large range of the powers PA1 -PA3, the controller 220 can select the gain switch range S1 in FIG. 1 as the second gain switch range, so that the power amplifier PA 200 has an increased time operating in the high gain mode, in comparison to other gain switch ranges. In other embodiments, the controller 220 is configured to determine the second gain switch range according to the distribution of the PA+ parameters. With less distribution of the PA+ parameters, the controller 220 is configured to determine the second gain switch range that has an increased time operating the power amplifier PA 200 under a lower gain mode. Conversely, with increased distribution of the PA+ parameters, the controller 220 is configured to determine the second gain switch range that has an increased time operating the power amplifier PA 200 under a higher gain mode.

Next, the controller 220 can determine whether the determined second gain switch range is different from the previous second gain switch range (S313). If the two second gain switch ranges are identical, the switch method 3 is configured to return to performing Step S310 for re-computing the PA parameters for the uplink signals. If the two second gain switch ranges are different, the switch method 3 is configured to evaluate whether the newly determined second gain switch range would result in degradation of the RF efficiency for the power amplifier PA 200 (S314). Step S314 is an optional step. In some embodiments, the switch method 3 can perform Step 316 directly without performing Step S314. The controller 220 is configured to compute an ACLR, EVM, transmit powers, SNR or QoS parameters for the amplified uplink signals, thereby evaluating the present RF efficiency of the power amplifier PA 200. When the determined second gain switch range causes unstable network connection or unsatisfactory QoS variation in the RF efficiency, the controller 220 is configured to retain the previous second gain switch range and the switch method 3 is configured to again perform Step S310 for re-computing the PA parameters. When the determined second gain switch range renders a satisfactory RF efficiency, the switch method 3 is configured to perform Step S316.

Since the switch method 3 deploys the internal information functionalities or the external information functionalities to determine the gain switch range, there could be 4 possible conditions, i.e., the internal information functionalities is activated while the external information functionalities is inactivated, the internal information functionalities is inactivated while the external information functionalities is activated, both the internal and external information functionalities are activated, or both the internal and external information functionalities are inactivated. In the condition where both the internal and external information functionalities are activated a confliction may arise between the gain switch ranges determined by the internal and external information. Thus, the switch method 3 performs Steps S316 through S320 to determine the gain switch range to be adopted by the power amplifier PA 200. In Step S316, the controller 220 is configured to compare the first and second gain switch ranges. When the two gain switch ranges are the same, the controller 220 is configured to employ the same gain switch range and the required power of the uplink signal to determine a gain mode for the power amplifier PA 200 (S324), and then the switch method 3 is completed and exited (S326). When the first and second gain switch ranges are different, the controller 220 is configured to select one of the first and second gain switch ranges as the gain switch range to be adopted by the power amplifier PA 200 (S318). In some embodiments, the controller 220 is configured to assign a first priority and a second priority to the internal information functionalities and the external information functionalities respectively, and the first and second priorities are different. The controller 220 is configured to determine which one of the first and second gain switch ranges is to be used as the adopted gain switch range. For example, the controller 220 can assign a higher priority to the internal information functionalities than to the external information functionalities. When the first gain switch range is different from the second one, the controller 220 will select the first gain switch range which corresponds to the internal information functionalities as the gain switch range to be used. In other embodiments, the controller 220 can determine a gain switch range corresponding to a smaller or reduced distribution of the PA parameters (the reduced power range of the transmit power) in the two distributions of the PA parameters (the first and second power ranges) as the gain switch range to be adopted, increasing the battery life of the communication device 2. In yet other embodiments, the controller 220 can determine a gain switch range corresponding to a larger or increased distribution of the PA parameters (the increased power range of the transmit power) in the two distributions of the PA parameters (the first and second power ranges) as the gain switch range to be adopted, increasing the signal quality of the uplink transmission for the communication device 2. Then the controller 220 can adopt the determined gain switch range and the required power of the uplink signal to determine the gain mode for the power amplifier PA 200 (S324). At this point the switch method 3 is completed and exited (S326).

The switch method 3 utilizes a plurality of gain switch ranges between two gain modes, allowing the communication device 2 to select an appropriate switch range for use by the power amplifier, rendering both the battery life and the signal quality of the uplink transmission improved.

Figure 5:
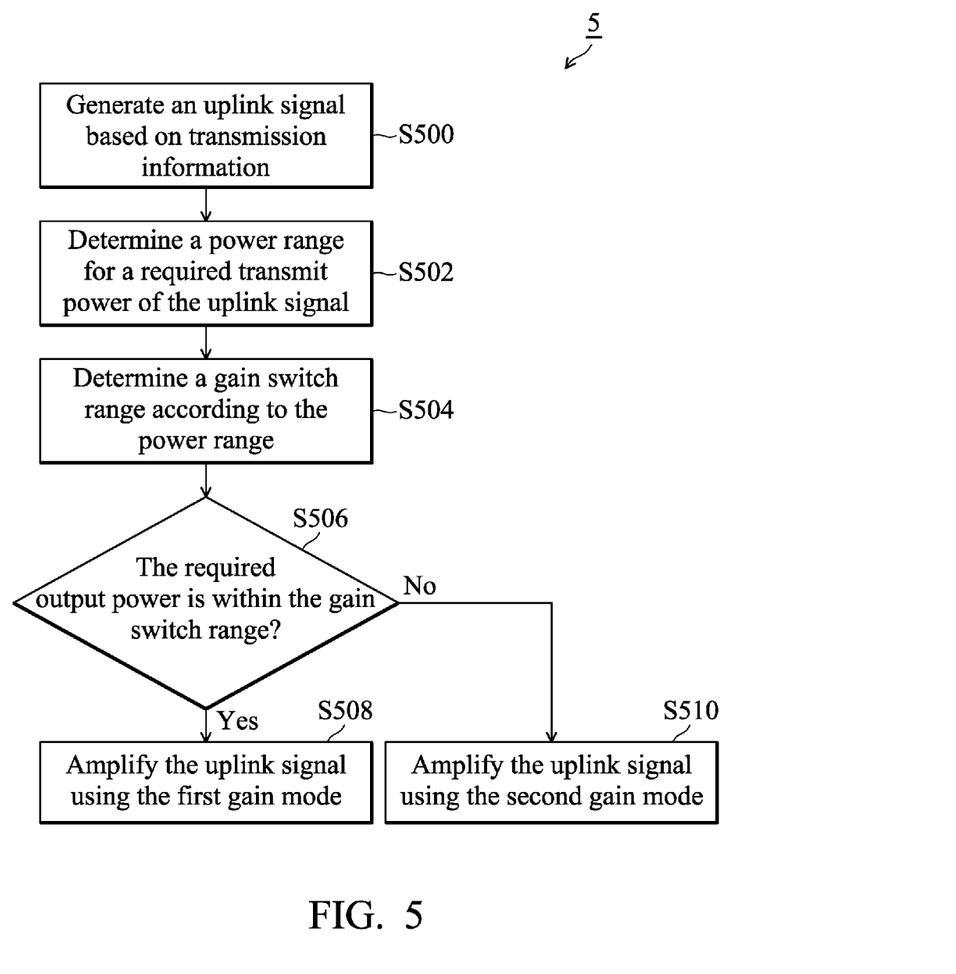
FIG. 5 is a flowchart of another switch method 5 switching gain modes for a power amplifier.

FIG. 5 is a flowchart of another switch method 5 switching gain modes for a power amplifier, incorporating the communication device 2 in FIG. 2.

After the communication device 2 is initialized, it can generate the uplink signal according to the transmission information (S500). The transmission information includes the internal information or the external information. The internal information may be the upload speed, the bandwidth limit, the data stream limit and other internal information configured by the communication device 2. The internal information may be the information on the number of carriers, the assigned transmit power, the quality of service, and other information regarding the external environment of the communication device 2. Next, after a period of data analysis for transmit powers of the uplink signals, the controller 220 can determine the power range of the required powers for the uplink signals (S502), and determine the gain switch range based on the power range (S504). Referring now to FIG. 4 and FIG. 1, when the power range of the required power is the load 1 as illustrated in FIG. 4, the controller 220 can select the gain switch range S2 in FIG. 1 as the gain switch range. The communication device 2 can determine whether the transmit power of the uplink signal is within the gain switch range, i.e., whether the transmit power of the uplink signal is between the upper limit and lower limit of the gain switch range. Taking FIG. 1 as an example, when the gain switch range S2 is selected, the communication device 2 can determine whether the transmit power of the uplink signal is between the powers P5 and P6. If so, the communication device 2 can amplify the uplink signal with the first gain mode (S508). In the example of selecting the gain switch range S2 as illustrated in FIG. 1, when the transmit power of the uplink signal is out of the gain switch range, i.e., the transmit power of the uplink signal is less than the power P5 or exceeds the power P6, the communication device 2 can amplify the uplink signal with the second gain mode (S510). The first gain mode is different from the second gain mode, wherein the first gain mode is a default value loaded by the communication device 2 during circuit initialization or the last value adopted by the communication device 2. When the transmit power of the uplink signal is less than the power P5, the second gain mode is lower than the first gain mode. Whereas when the transmit power of the uplink signal exceeds the power P6, the second gain mode is higher than the first gain mode.

The switch method 5 utilizes a plurality of gain switch ranges between two gain modes, allowing the communication device 2 to select an appropriate switch range for use by the power amplifier, rendering both the battery life and the signal quality of the uplink transmission improved.

As used herein, the term "determining" encompasses calculating, computing, processing, deriving, investigating, looking up (e.g., looking up in a table, a database or another data structure), ascertaining and the like. Also, "determining" may include resolving, selecting, choosing, establishing and the like.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device, discrete gate or transistor logic, discrete hardware components or any combination thereof designed to perform the functions described herein. A general purpose processor may be a microprocessor, but in the alternative, the processor may be any commercially available processor, controller, microcontroller or state machine.

The operations and functions of the various logical blocks, modules, and circuits described herein may be implemented in circuit hardware or embedded software codes that can be accessed and executed by a processor.

While the disclosure has been described by way of example and in terms of the preferred embodiments, it is to be understood that the disclosure is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A power control method, performed by a communication device, comprising:
   determining a power range of a transmit power of an uplink signal;
   determining a gain switch range based on the power range;
   when the transmit power of the uplink signal is within the gain switch range, determining a first gain mode for amplifying the uplink signal; and
   when the transmit power of the uplink signal is out of the gain switch range, determining a second gain mode for amplifying the uplink signal.

2. The power control method of claim 1, further comprising:
   receiving a downlink signal from an air interface; and
   determining external information according to the downlink signal,
   wherein, the determining the power range step comprises, determining the transmit power of the uplink signal according to the external information.

3. The power control method of claim 1, further comprising:
   configuring internal information,
   wherein, the determining the power range step comprises, determining the transmit power of the uplink signal according to the internal information.

4. The power control method of claim 1, wherein, the when the transmit power of the uplink signal is out of the gain switch range step comprises:
   determining a first signal quality using the first gain mode;
   determining a second signal quality using the second mode; and
   when the second signal quality is less than or equal to the first signal quality, amplifying the uplink signal with the first gain mode.

5. The power control method of claim 1, wherein, the determining the power range step comprises, applying digital modulation and available radio resources to the uplink signal to determine the transmit power.

6. The power control method of claim 1, wherein:
   the power range comprises an upper power range defined by an upper limit power and an average power; and
   the determining the power range step comprises, determining the gain switch range according to the upper power range.

7. The power control method of claim 1, further comprising:
   receiving a downlink signal from an air interface to determine external information; and
   configuring internal information,
   wherein the internal information and the external information correspond to first and second priorities, respectively,
   the determining the power range step comprises, determining a first power range according to a first transmit power of the uplink signal according to the external information, and determining a second power range according to a second transmit power of the uplink signal according to the internal information, and
   the determining the gain switch range step comprises, determining a first gain switch range according to the first power range, determining a second gain switch range according to the second power range, and determining one of the first and the second gain switch ranges as the gain switch range based on the first and second priorities.

8. The power control method of claim 1, further comprising:
   receiving a downlink signal from an air interface to determine external information; and
   configuring internal information,
   wherein, the determining the power range step comprises, determining a first power range according to a first transmit power of the uplink signal according to the external information, and determining a second power range according to a second transmit power of the uplink signal according to the internal information, and
   the determining the gain switch range step comprises, determining a first gain switch range according to the first power range, determining a second gain switch range according to the second power range, and determining a corresponding gain switch range of a smaller one of the first and the second power ranges as the gain switch range.

9. The power control method of claim 1, further comprising:
   receiving a downlink signal from an air interface to determine external information; and
   configuring internal information,
   wherein, determining the power range step comprises, determining a first power range according to a first transmit power of the uplink signal according to the external information, and determining a second power range according to a second transmit power of the uplink signal according to the internal information,
   the determining the gain switch range step comprises, determining a first gain switch range according to the first power range, determining a second gain switch range according to the second power range, and determining a corresponding gain switch range of a larger one of the first and the second power ranges as the gain switch range.

10. A communication device, comprising:
    a controller, configured to determine a power range of a transmit power of an uplink signal, determine a gain switch range based on the power range, when the transmit power of the uplink signal is within the gain switch range, determine a first gain mode, and when the transmit power of the uplink signal is out of the gain switch range, determine a second gain mode; and
    a power amplifier, coupled to the controller, configured to amplify the uplink signal with the first or the second gain mode.

11. The communication device of claim 10, further comprising:
    a receiver, coupled to the controller, configured to receive a downlink signal from an air interface,
    wherein the controller is configured to determine external information according to the downlink signal, and determine the transmit power of the uplink signal according to the external information.

12. The communication device of claim 10, wherein the controller is adapted to configure internal information, and determine the transmit power of the uplink signal according to the internal information.

13. The communication device of claim 10, wherein the controller is configured to determine a first signal quality using the first gain mode, and determine a second signal quality using the second mode, and when the second signal quality is less than or equal to the first signal quality, the power amplifier is configured to amplify the uplink signal with the first gain mode 14. The communication device of claim 10, wherein the controller is configured to apply digital modulation and available radio resources to the uplink signal to determine the transmit power.

15. The communication device of claim 10, wherein the power range comprises an upper power range defined by an upper limit power and an average power, and the controller is configured to determine the gain switch range according to the upper power range.

16. The communication device of claim 10, further comprising:
    a receiver, coupled to the controller, configured to receive a downlink signal from an air interface to determine external information,
    wherein the controller is adapted to configure internal information,
    the internal information and the external information correspond to first and second priorities, respectively,
    the controller is configured to determine a first power range according to a first transmit power of the uplink signal according to the external information, and determine a second power range according to a second transmit power of the uplink signal according to the internal information, and determine a first gain switch range according to the first power range, determine a second gain switch range according to the second power range, and determine one of the first and the second gain switch ranges as the gain switch range based on the first and second priorities.

17. The communication device of claim 10, further comprising:
    a receiver, coupled to the controller, configured to receive a downlink signal from an air interface to determine external information,
    wherein the controller is adapted to configure internal information,
    the internal information and the external information correspond to first and second priorities, respectively,
    the controller is configured to determine a first power range according to a first transmit power of the uplink signal according to the external information, and determine a second power range according to a second transmit power of the uplink signal according to the internal information, and determine a first gain switch range according to the first power range, determine a second gain switch range according to the second power range, and determine a corresponding gain switch range of a smaller one of the first and the second power ranges as the gain switch range.

18. The communication device of claim 10, further comprising:
    a receiver, coupled to the controller, configured to receive a downlink signal from an air interface to determine external information,
    wherein the controller is adapted to configure internal information,
    the internal information and the external information correspond to first and second priorities, respectively;
    the controller is configured to determine a first power range according to a first transmit power of the uplink signal according to the external information, and determine a second power range according to a second transmit power of the uplink signal according to the internal information, and determine a first gain switch range according to the first power range, determine a second gain switch range according to the second power range, and determine a corresponding gain switch range of a larger one of the first and the second power ranges as the gain switch range.

* * * * *